US008925060B2

(12) United States Patent  (10) Patent No.: US 8,925,060 B2
Chakra et al.  (45) Date of Patent: *Dec. 30, 2014

(54) SELECTING IMAGE OR VIDEO FILES FOR CLOUD STORAGE

(71) Applicant: International Business Machines Corporation, Armonk, NY (US)

(72) Inventors: Al Chakra, Apex, NC (US); John A. Feller, Cary, NC (US); Trudy L. Hewitt, Cary, NC (US); Francesco C. Schembari, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/732,641

(22) Filed: Jan. 2, 2013

(65) Prior Publication Data

US 2014/0189803 A1  Jul. 3, 2014

(51) Int. Cl.
*H04L 29/06* (2006.01)

(52) U.S. Cl.
CPC ..................... *H04L 63/08* (2013.01)
USPC ...... 726/7; 726/28; 726/29; 726/31; 715/741; 382/100; 382/103; 382/112; 382/115; 707/640; 707/812

(58) Field of Classification Search
CPC .................. G06F 21/6218; G06F 2221/2111
USPC .................... 726/2–4, 7, 28, 29, 31; 715/741; 382/100, 103, 112, 115; 707/640, 812
See application file for complete search history.

(56) References Cited

U.S. PATENT DOCUMENTS

| 7,555,613 | B2 | 6/2009 | Ma |
| 7,610,296 | B2 | 10/2009 | Hughes et al. |
| 7,631,002 | B2 | 12/2009 | Numanoi et al. |
| 7,751,628 | B1 | 7/2010 | Reisman |
| 8,161,251 | B2 | 4/2012 | Obr et al. |
| 8,839,392 | B2 | 9/2014 | Chakra et al. |
| 2006/0203261 | A1* | 9/2006 | Kacker ................... 358/1.6 |
| 2011/0138050 | A1 | 6/2011 | Dawson et al. |
| 2011/0173240 | A1 | 7/2011 | Bryniarski et al. |
| 2011/0176528 | A1 | 7/2011 | Lu et al. |
| 2011/0208958 | A1 | 8/2011 | Stuedi et al. |
| 2012/0188382 | A1* | 7/2012 | Morrison et al. ......... 348/207.1 |
| 2012/0207356 | A1* | 8/2012 | Murphy ................... 382/115 |
| 2012/0226663 | A1* | 9/2012 | Valdez Kline et al. ...... 707/640 |
| 2013/0024919 | A1* | 1/2013 | Wetter et al. .............. 726/6 |

(Continued)

OTHER PUBLICATIONS

U.S. Appl. No. 13/761,659, filed Feb. 7, 2013, 33 pages.

(Continued)

*Primary Examiner* — Hadi Armouche
*Assistant Examiner* — Hee Song
(74) *Attorney, Agent, or Firm* — Yee & Associates, P.C.; Parashos Kalaitzis

(57) ABSTRACT

A method, apparatus, and computer program product, responsive to receiving a data from a computing device connected to the computer in a cloud computing system or data center, identifies a criteria associated with the computing device, responsive to identifying the criteria, determines whether the data is authorized for transmission to a storage in the cloud computing system or data center, and responsive to determining that the data is authorized for transmission to the storage, forwards the data to the storage.

17 Claims, 6 Drawing Sheets

(56) References Cited

U.S. PATENT DOCUMENTS

2013/0216094 A1* 8/2013 DeLean ................. 382/103
2013/0336543 A1* 12/2013 Bennett et al. ............ 382/112
2014/0184820 A1 7/2014 Chakra et al.

OTHER PUBLICATIONS

"Automatic Bidirectional Linking of Objects from Different Cloud Services," IP.com PriorArtDatabase, IPCOM000219801D, Jul. 2012, 6 pages.

"Dynamically choosing the image shown in video enabled collaboration tools based on changes in observed images," IBM, IP.com PriorArtDatabase, IPCOM000180545D, Mar. 2009, 3 pages.

Office Action dated Mar. 6, 2014, regarding U.S. Appl. No. 13/761,659, 13 pages.

Mell et al., "The NIST Definition of Cloud Computing," Oct. 2009, 2 pages.

Notice of allowance dated May 12, 2014, regarding U.S. Appl. No. 13/761,659, 15 pages.

* cited by examiner

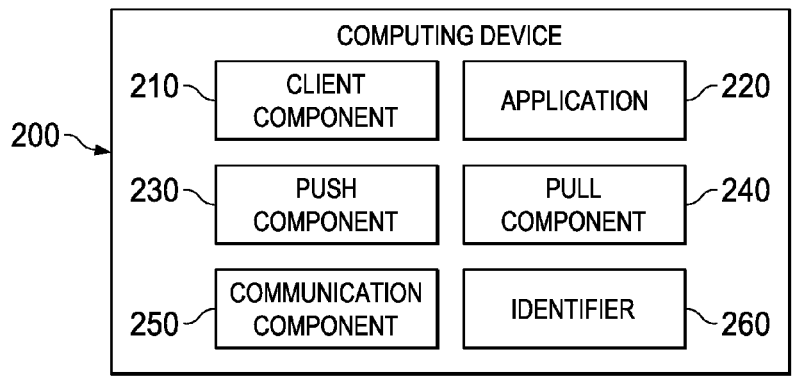
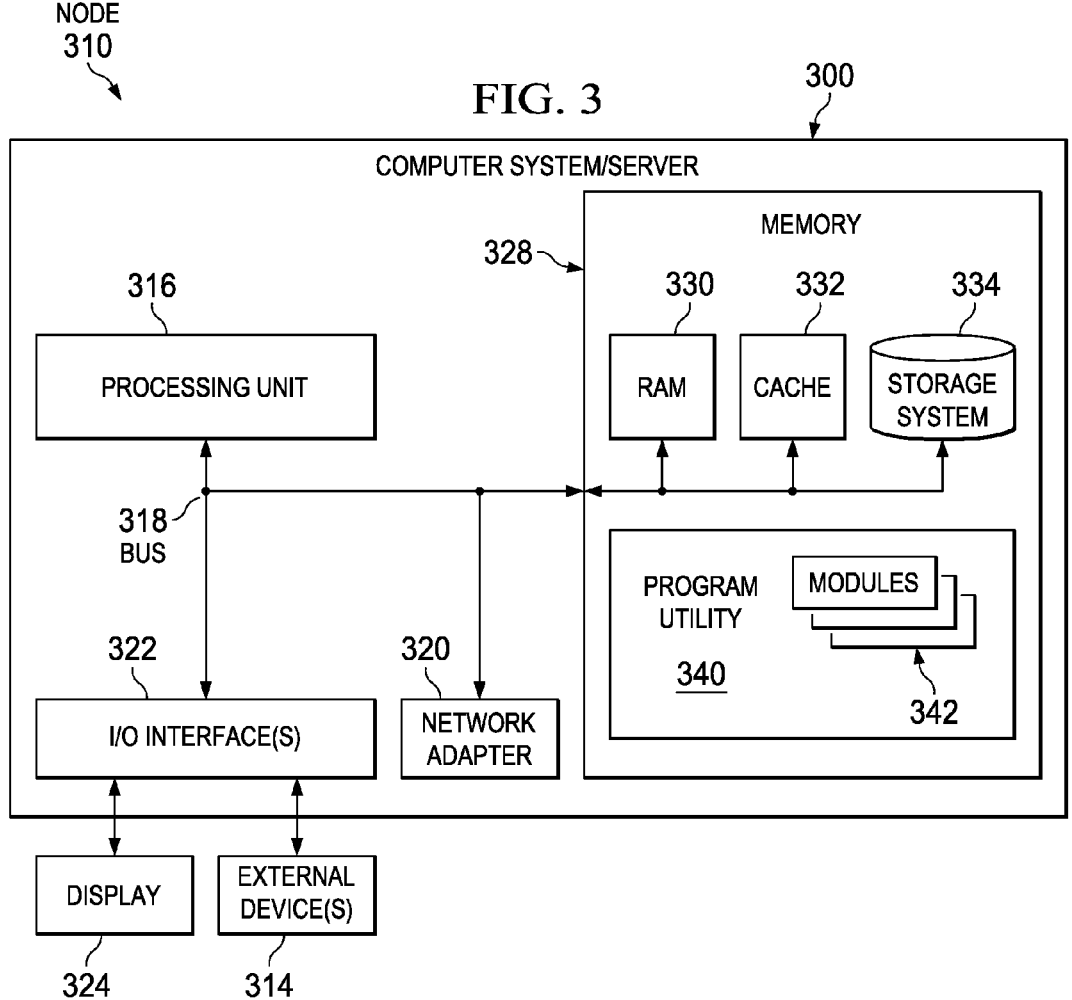

SELECTING IMAGE OR VIDEO FILES FOR CLOUD STORAGE

BACKGROUND

1. Field

The disclosure relates generally to selecting and storing data, and specifically to a computer implemented method, a computer program product, and a data processing system for directing data to a cloud storage or a data center in accordance with configured criteria.

2. Description of the Related Art

The combination of mobile personal computing devices and cloud computing has enabled large amounts of data to be uploaded from the mobile computing for backup storage in the cloud computing environment. Uploading of data for backup may take place automatically so that the amount of data being stored in the cloud computing environment may exceed contractual limits before a user of the personal computing device is aware of the situation. When contractual limits are exceeded data may be refused storage or undesired charges may be incurred.

Therefore, it would be advantageous to have a method and apparatus that takes into account at least some of the issues discussed above, as well as possibly other issues.

SUMMARY

In illustrative embodiments, a method, apparatus, and computer program product, responsive to receiving a data from a computing device connected to the computer in a cloud computing system or data center, identifies a criteria associated with the computing device, responsive to identifying the criteria, determines whether the data is authorized for transmission to a storage in the cloud computing system or data center, and responsive to determining that the data is authorized for transmission to the storage, forwards the data to the storage.

BRIEF DESCRIPTION OF THE SEVERAL VIEWS OF THE DRAWINGS

FIG. 2 is a block diagram of a personal computing device depicted in accordance with an illustrative embodiment;

FIG. 3 is a block diagram of a server computer depicted in accordance with an illustrative embodiment;

DETAILED DESCRIPTION

Figure 1:
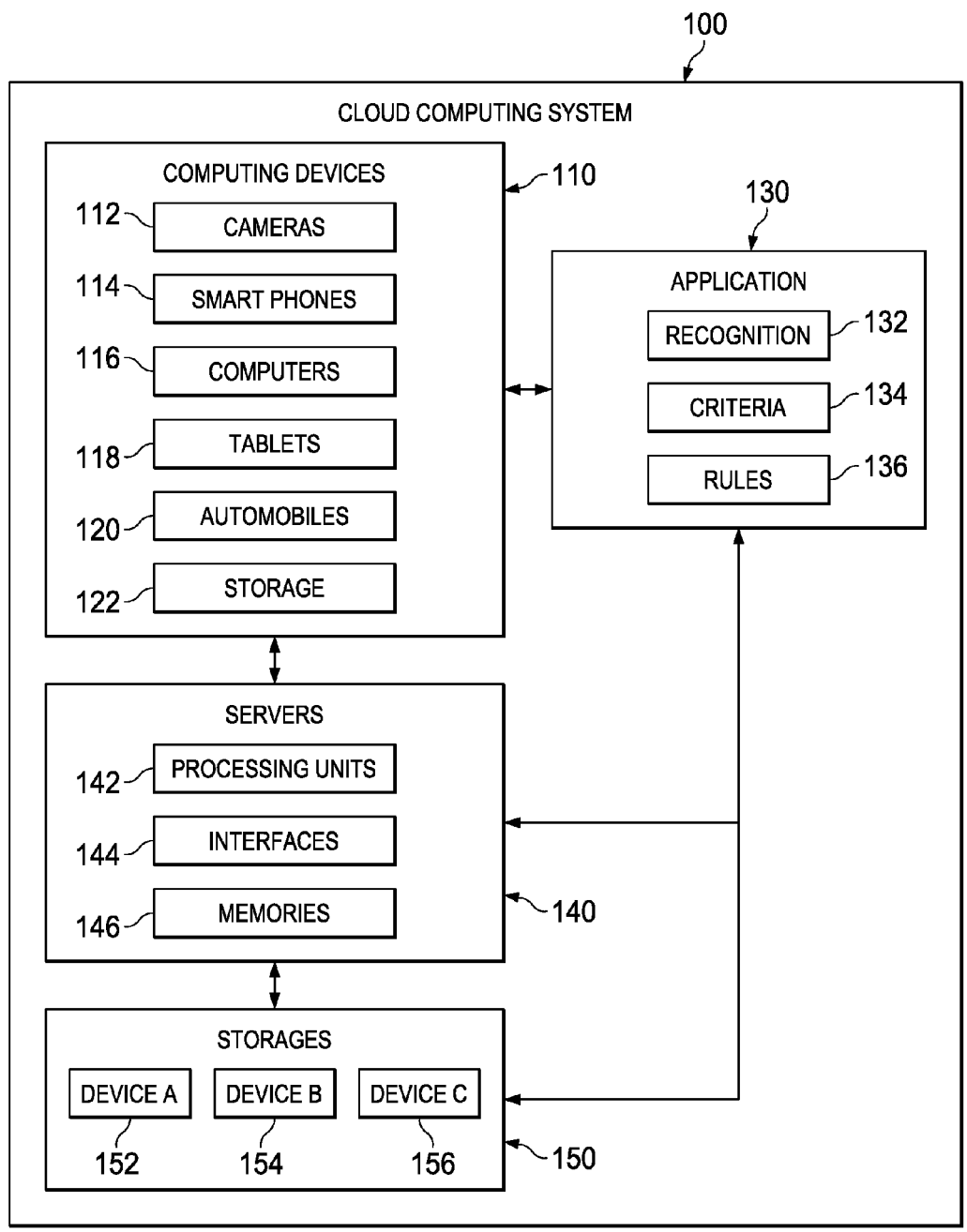
FIG. 1 is a block diagram of a cloud computing system depicted in accordance with an illustrative embodiment.

Personal computing devices may generate data for automatic backup storage in a cloud computing environment, and such automatic backup storage may cause a user of the personal computing device to store more data than the user may desire. Storing more data than desired may have consequences for the user. For example, a user may exceed a service level contract requirement and incur additional charges. Moreover, a user may exceed a threshold storage level that results in data not being backed up in the cloud computing environment. Furthermore, the user may not be aware that the threshold has been exceeded and may continue to generate data that will not be backed up. Should the user's mobile device be lost, damaged, or stolen, some or all of the user's data may be lost.

Persons skilled in the art recognize and take into account that automatic data backup requires storage of different sizes depending on the type of data generated. For example, high definition image or video files of landscapes may take up more data than image or video files of objects or persons. In addition, the ease with which image or video files may be taken may result in a larger number of image or video files being taken than would be the case if automatic backup and storage were not available. For example, a person may delete files on a camera when the camera storage is full, but the same person may not be aware of the amount of storage consumed by automatic backup to a cloud computing environment. Indeed, a user may want to retain more image or video files in the cloud storage than on the camera, but may not be aware of the rate of consumption of storage on the cloud computing environment. A user may not have time to monitor backup storage or may not have the time to delete items from the cloud computing environment in order to create additional storage.

In an illustrative embodiment, a mobile device may be a digital camera. A user may take image or video of files of landscapes at the beginning of a vacation and take image or video files of his family later in the vacation. The user may lose the camera and because of the size of the storage for the landscape image or video files, find out that backup storage for the family image or video files was refused. The user would rather have had the family image or video files saved, but no provision was made to select among the data generated by the user with the digital camera.

In an illustrative embodiment, a user may configure a computer to control automatic backup storage in a cloud computing environment. The computer may be configured to only transmit data for backup storage on the cloud computing environment in accordance with a criteria established by the user. The criteria may be used to select data for storage. The data may be image or video files.

Therefore, in an illustrative embodiment, data may be selected for transmission to storage in a cloud computing environment. Data that is automatically sent to a cloud computing environment for storage may be prioritized based on one or more criteria. The criteria may be pre-defined by a user. The criteria may be one or more user preferences. The criteria may be pre-defined by the user in an application that may be run on one or more processors in a computing device, in a server in a cloud computing system, or in a server in a data center.

In an illustrative embodiment, criteria may be identifying image or video files that are shared via social media or email, image or video files that are rated by the user, characteristics of the image or video files such as whether a subject of an image or video file is smiling and whether the subject has his or her eyes open. In an illustrative embodiment, an image or video file may be analyzed using facial recognition algorithms to determine an identity of a person in the image or video file. In an illustrative embodiment, the image file may be a photograph. In addition, criteria may be based on clarity of the image or video file data. Criteria based on the clarity of the image or video file data may eliminate blurry or unfocused images or videos from being saved to backup storage. In an illustrative embodiment, predictive algorithms may be used to determine which image or video files a user may most likely want to keep. In an illustrative embodiment, a image or video file may be examined by a processing engine to determine if the composition of the image or video file would be similar to those that were previously liked by the user and prioritization of the image or video files for storage in a cloud computing system or data center would be given to the image or video files that are identified as having higher likelihood of being a favorite image or video of the user.

In addition to selecting data, such as image or video files for backup storage in a cloud computing environment, a user may be provided with an ability to determine when a prioritization of storage in the cloud computing environment may occur. In an illustrative example, prioritization may be established by setting one or more defaults by a system administrator. In another illustrative example, the prioritization may be established by a user selecting a customized setting. A customized setting may be to activate prioritization when the user has a specified amount of storage remaining, such as for example, one gigabyte (1GB) remaining. A customized setting may be to activate prioritization when changes in user behavior are identified. For example, a user may normally take two image or video files a week, but then takes three hundred image or video files in a single day. The foregoing change in user behavior may automatically trigger activation of the prioritization.

In an illustrative example, prioritization may be activated in response to a calculation of a change in a rate at which data is being stored. For example, data may be transmitted for storage at a particular rate and a projected time for when the storage will reach capacity may be calculated. For example, a user may take five hundred image or video files in a forty-eight hour period, and an algorithm may calculate that at the rate of five hundred image or video files in forty-eight hours, the storage capacity will be exceeded in twenty four hours.

In the foregoing illustrative examples, scenarios have been presented in regard to image or video files. Persons skilled in the art recognize and take into account that similar steps for selecting and prioritizing data for storage may be taken in regard to other types of data including without limitation video data, audio clips, game data, and text files.

Turning to FIG. 1, a block diagram of a cloud computing system is depicted in accordance with an illustrative embodiment. Cloud computing system 100 comprises computing devices 110, applications 130, servers 140, and storages 150. Cloud computing system 100 may be in a cloud computing environment such as depicted in the illustrative embodiment of FIG. 4. Cloud computing system 100 may include functional abstraction layers such as depicted in the illustrative embodiment of FIG. 5.

Computing devices 110 may be mobile computing devices such as cameras 112, smart phones 114, computers 116, tablets 118, automobiles 120, and device storage 122. Computing devices 110 may have storage 122. Persons skilled in the art recognize and take into account that each computing device of computing devices 110 may have a storage such as storage 122 and that there may be any number of storages such as storage 122. Storage 122 is illustrated by way of example and not by way of limitation. Persons skilled in the art recognize and take into account that additional mobile computing devices may be available to users. Computing devices 110 are illustrated by way of example and not by way of limitation. As used herein, computing devices are computing devices that generate data that is stored for backup on storage devices in a cloud computing system such as cloud computing system 100. Cameras 112 may generate data for storage of image or video files such as photographs and video segments. Persons skilled in the art recognize and take into account that image or video files may include audio segments and other data entered by a user or by camera or mobile computing device such as date and time information, coordinates from a geophysical location system in the camera or associated with the camera. Smart phones 114 may generate the same types of data as cameras 112 and in addition may include movies, sound tracks, games, electronic newspapers, documents linked to pages displayed on the smart phone, and any type of data that may be downloaded from the internet or phone connection.

Computers 114 and tablets 116 may be computing devices 110 and may generate the same types of data as cameras 112 and smart phones 114 as well as additional data that may be generated or received over the Internet via applications. Automobiles 120 may have computing devices built in and may generate data in accordance with sensors connected to power train, safety systems, environmental systems and other systems. In addition, automobiles 120 may provide connectivity for computing devices such as cameras 112, smart phones 114, computers 116, and tablets 118. Persons skilled in the art recognize and take into account that computing devices 110 may take additional forms that provide mobility and personal computing devices that generate data that is stored for backup on storage devices in a cloud computing system such as cloud computing system 100. Computing devices 110 may be computing device 200 discussed below in FIG. 2.

Servers 140 may be computers connected to computing devices 110 by cloud computing system 100. Servers 140 comprise processing units 142, interfaces 144 and memories 146. Servers 140 may be computer system/server 300 discussed below in FIG. 3.

Storages 150 may comprise storage devices connected to computing devices 110 via servers 140 by cloud computing system 100. Storage devices may comprise storage device A 152, storage device B 154 and storage device C 156. Persons skilled in the art recognize and take into account that storages 150 may comprise any number of storage devices and storage devices 152, 154, and 156 are illustrated by way of example and not by way of limitation. Storages 150 may be storage devices in cloud computing environment 450 discussed below in FIG. 4 and may comprise storage processing 510 discussed below in FIG. 5. In an illustrative example, storages 150 may be in a data center.

Applications 130 may be stored in storage 122 of computing devices 200, memories 146 of servers 140, and storages 150 of cloud computing system 100. Applications 130 may comprise recognition application 132, criteria application 134, and rules application 136. In an illustrative embodiment recognition application 132 may be a facial recognition application. In an illustrative embodiment, criteria application 134 may determine selection of data for storage based upon predefined criteria by a user. In an illustrative embodiment, rules application 136 may tag image and video files for storage based on compliance with a rule authorizing storage. In an illustrative embodiment, a rule may direct image or video files tagged as authorized for transmission to storage in the cloud computing system to an identified particular storage device such as device A 152, device B 154 or device C 156 in storages 150 in FIG. 1.

In an illustrative embodiment, recognition application 132 may comprise computer program instructions stored in one or more storage devices in storages 150 for execution via one or more memories 146 in servers 140 for processing of data from computing devices 110. Criteria application 134 may comprise computer program instructions stored in one or more storage devices in storages 150 for execution via one or more memories 146 in servers 140 for processing of data from computing devices 110. Rules application may comprise computer program instructions stored in one or more storage devices in storages 150 for execution via one or more memories 146 in servers 140 for processing of data from computing devices 110.

Turning to FIG. 2, a block diagram of a computing device is depicted in accordance with an illustrative embodiment. Computing device 200 may be a mobile computing device comprising client component 210, application 220, push component 230, pull component 240, communication component 250, and identifier 260. Client component 210 may be hardware, software, or a combination of hardware and software that makes up camera 112, smart phone 114, computers 116, tablets 118, and automobiles 120 in FIG. 1. Application 220 may be an application such as recognition application 132, criteria application 134, and rules application 136 in FIG. 1. Push component 230 may send data for storage in storages 150 in cloud computing system 100 in FIG. 1. Pull component 230 may receive instructions from applications 130 when applications 130 are stored in storages 150. Communication component 250 may be any communication device known to persons skilled in the art to provide communication between computing device 200 and a cloud computing system such as cloud computing 100 in FIG. 1. Identifier 260 may be a code in the data. In an illustrative embodiment, the code may be one of a timestamp, a rating, a sharing code, an email address, and a social media designation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.\

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes. A cloud computing environment may comprise cloud computing system 100 in FIG. 1.

Referring now to FIG. 3, a schematic of an example of a cloud computing node is shown. Cloud computing node 310 is only one example of a suitable cloud computing node and is not intended to suggest any limitation as to the scope of use or functionality of embodiments of the invention described herein. Regardless, cloud computing node 310 is capable of being implemented and/or performing any of the functionality set forth hereinabove.

In cloud computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. In illustrative embodiments, computing devices such as computing devices 110 in FIG. 1 comprising cameras 112, smart phones 114, computers 116, tables 118 and automobiles 120 in FIG. 1.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via I/O interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Figure 4:
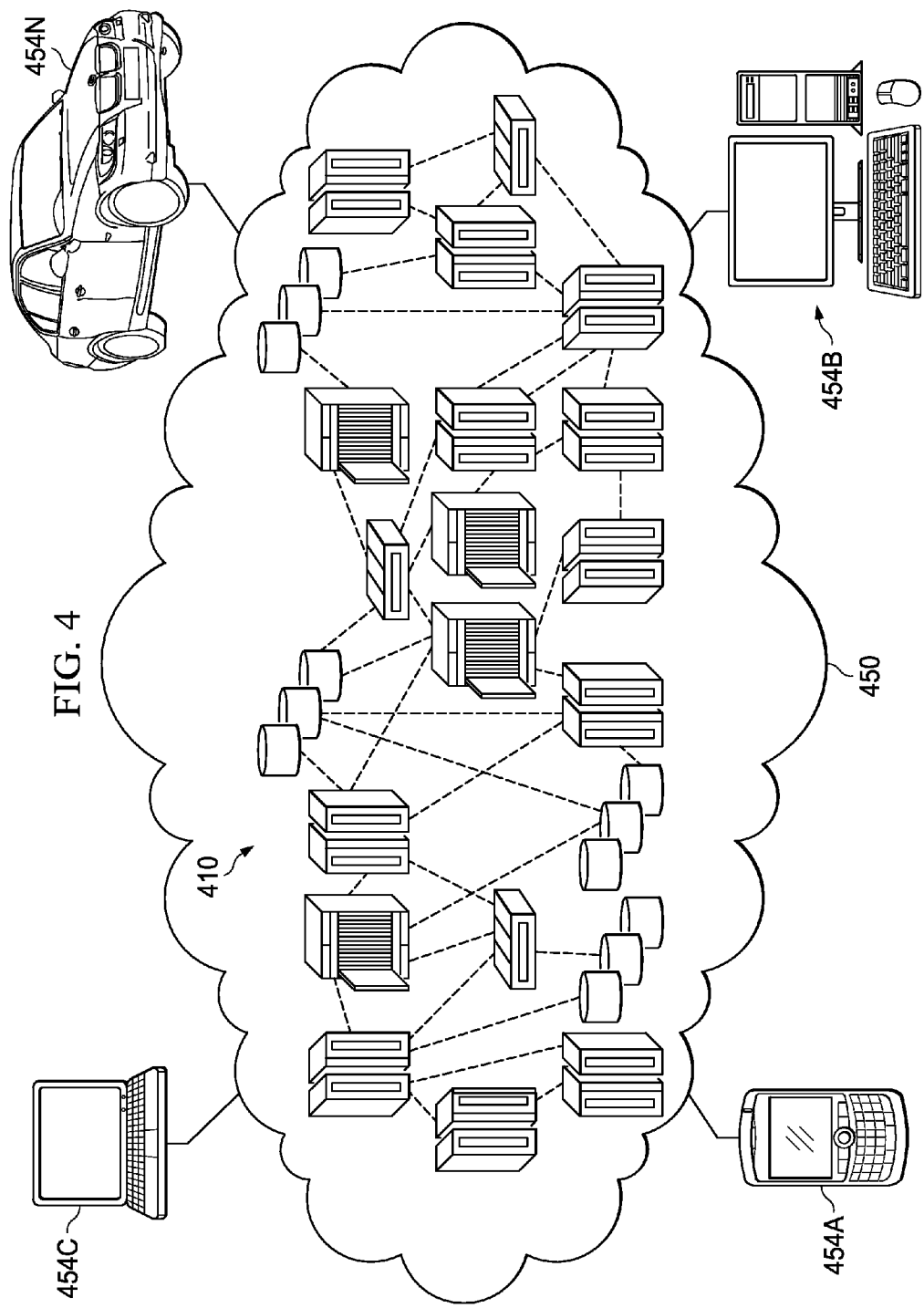
FIG. 4 is a cloud computing environment depicted in accordance with an illustrative embodiment.

Referring now to FIG. 4, illustrative cloud computing environment 450 is depicted. As shown, cloud computing environment 450 comprises one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. In an illustrative embodiment, cloud computing nodes may comprise a data center. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 can communicate with any type of computerized device over any type of network and/or network addressable connection (e.g., using a web browser) including without limitation computing devices 110 such as cameras 112, smart phones 114, computers 116, tablets 118, and automobiles 120 in FIG. 1.

Figure 5:
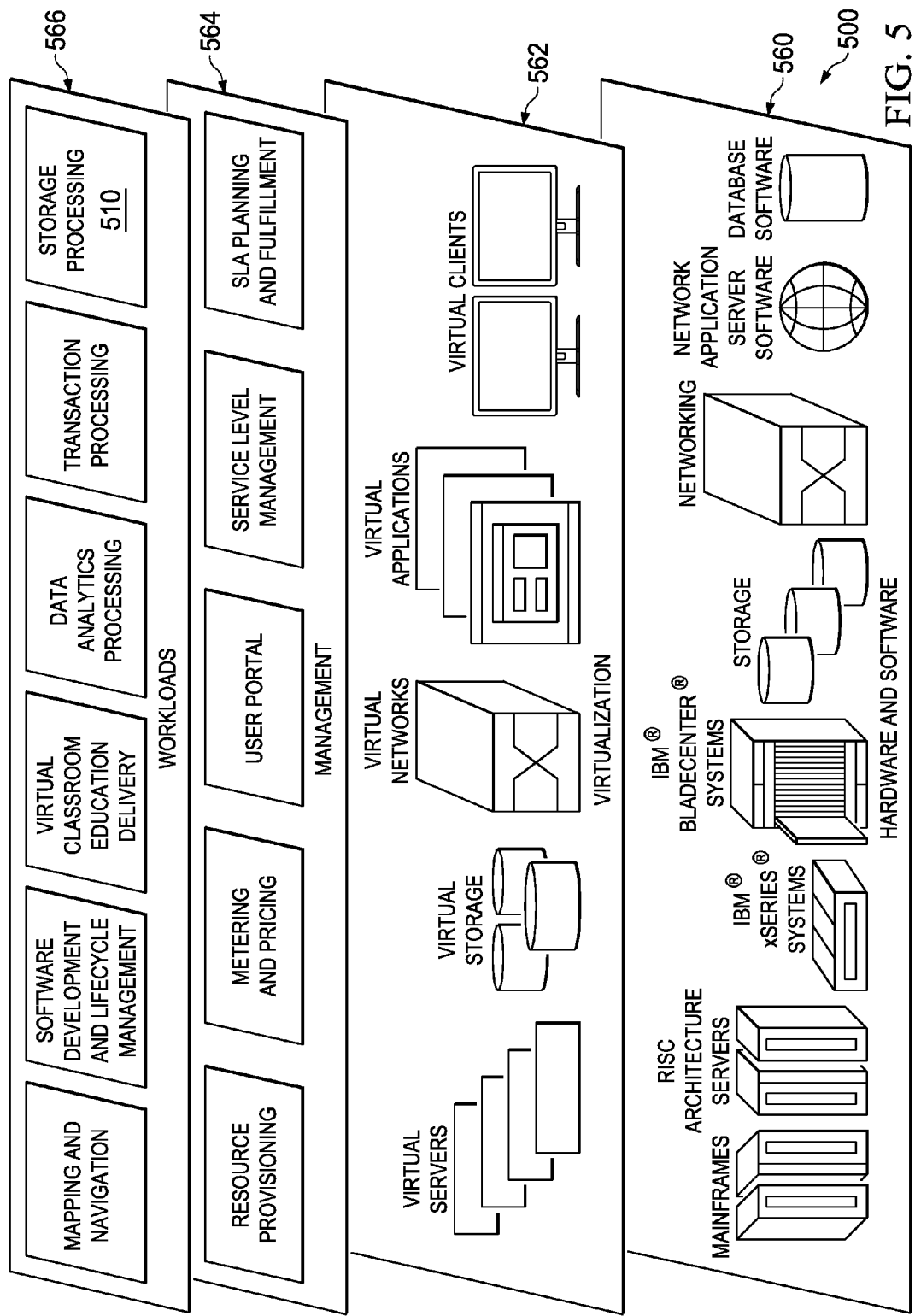
FIG. 5 is a set of functional abstraction layers provided by a cloud computing environment depicted in accordance with an illustrative embodiment.

Referring now to FIG. 5, a set of functional abstraction layers provided by cloud computing environment 550 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 562 provides an abstraction layer from which the following examples of virtual entities may be provided: virtual servers; virtual storage; virtual networks, including virtual private networks; virtual applications and operating systems; and virtual clients.

In one example, management layer 564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

In one example, management layer 564 may provide the functions described below. Applications, including all of the application components that comprise the application, are typically deployed to a common nodes or virtual machines within a cloud infrastructure. Thus, each instance of an application will contain each application component required for execution of the application.

Workloads layer 566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and storage processing 510. Storage processing 510 may comprise processing of storage of data 260 from computing devices 200 in backup 410 of storages 400 in cloud computing system 100 in FIG. 1. Storage processing 510 may be performed in accordance with a service level agreement associated with a computer system/server such as computer system/server 300 in cloud computing system node 310 in FIG. 3. In an illustrative embodiment, storage processing 510 may be performed by one or more data centers. The one or more data centers may be cloud computing node 410 in FIG. 4.

Figure 6:
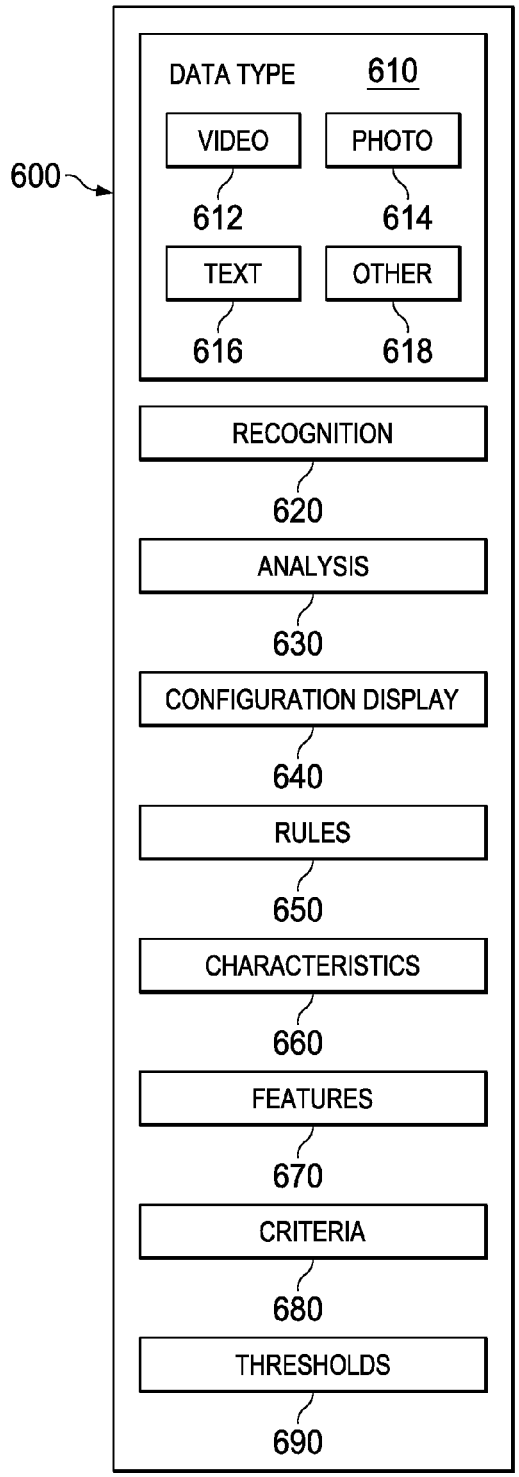
FIG. 6 is a block diagram of a server storage depicted in accordance with an illustrative embodiment.

Turning to FIG. 6, a block diagram of a server storage is depicted in accordance with an illustrative embodiment. Server storage 600 comprises data type 610. Data type 610 comprises video 612, photo 614, text 616, and other 618. In an illustrative embodiment, video 612 may be a video file containing moving images recorded by a mobile computing device such as computing devices 110 in FIG. 1 and computing device 200 in FIG. 2. In an illustrative embodiment, photo 614 may be an image file containing a photograph recorded by a mobile computing device such as computing devices 110 in FIG. 1 and computing device 200 in FIG. 2. Server storage 600 further comprises characteristics 660, features 670, criteria 680, thresholds 690, recognition 620, analysis 630, configuration display 640, and rules 650. Configuration display 640 may comprise a menu, a graphical user interface, a touch screen, or any display known to persons skilled in the art for presenting to a user choices for selection in regard to data type 610, characteristics 660, features 670, criteria 680, thresholds 690, recognition 620, analysis 630, and rules 650 so that a user may configure processing of data from computing devices 200 for storage in storages 150 in FIG. 1.

In an illustrative embodiment, criteria 680 may be a characteristic of a person in an image or video file. In an illustrative embodiment, the image may be a photograph. The characteristic may be one of an expression, a color of hair, a color of eyes, and a color of a face. In another illustrative embodiment, criteria 680 may be a characteristic of an object, wherein the characteristic is one of a clarity, an absence of blurriness, a blurriness, a defect, and a color of the object. In yet another illustrative embodiment, criteria 680 may be a characteristic of a landscape, wherein the characteristic is one of a mountain, a seashore, a lake, and a city.

Figure 7:
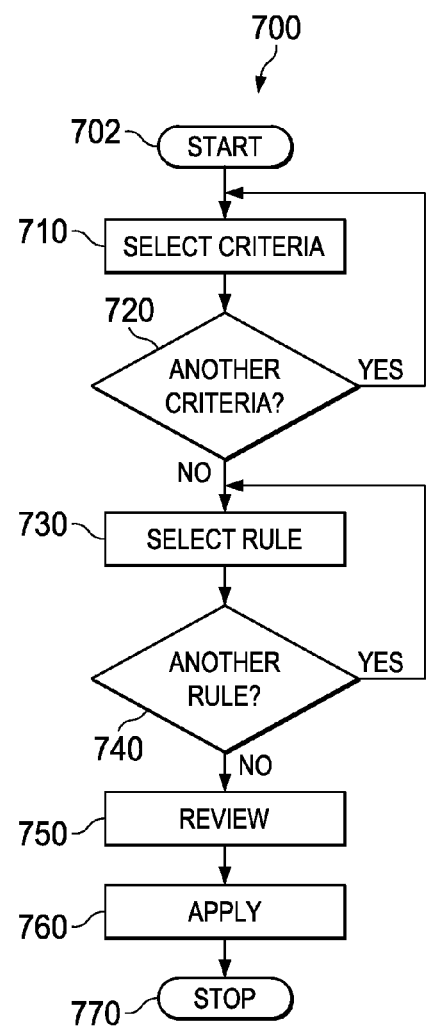
FIG. 7 is a flow chart of a configuration process depicted in accordance with an illustrative embodiment.

Turning to FIG. 7, a flow chart of a configuration process is depicted in accordance with an illustrative embodiment. Configuration process 700 starts (step 702) and a user selects a criteria (step 710). A determination is made whether the user has completed selecting criteria (step 720) and if not, configuration process 700 returns to step 710, and if so, proceeds to step 730. A user selects a rule (step 730). A determination is made whether the user has completed selecting rules (step 740) and if not, configuration process 700 returns to step 730, and if so, proceeds to step 750. The user reviews selections of criteria and rules (step 750) and applies the selections (step 760). After the user applies the selections in step 760, configuration process 700 stops.

Figure 8:
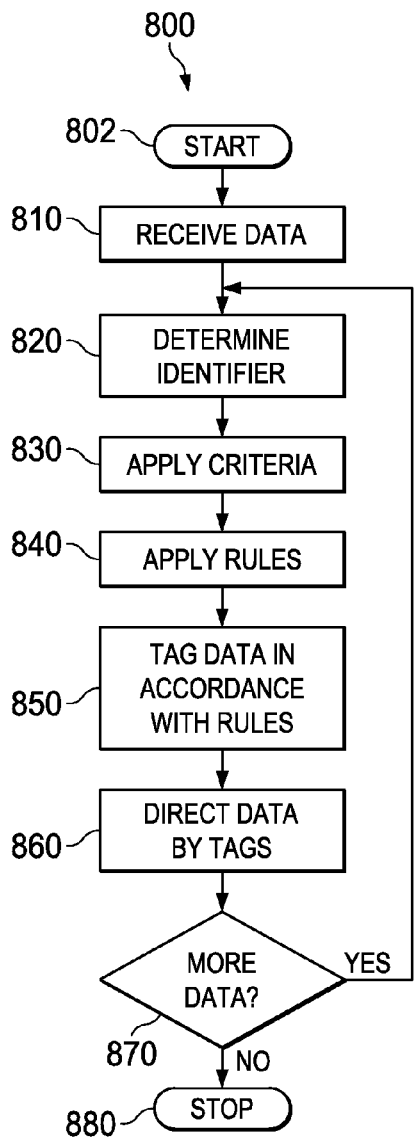
FIG. 8 is a flow chart of a data analysis process depicted according to an illustrative embodiment.

Turning to FIG. 8, a flow chart of a data analysis process is depicted according to an illustrative embodiment. Data analysis process 800 receives data (step 810). The data may be data from computing devices 110 in cloud computing system 100 in FIG. 1. Data analysis process 800 may be an application such as application 130 in FIG. 1 and may comprise one of recognition application 132, criteria application 134, and rules application 136 in FIG. 1 and stored in a storage device of storages 150 connected to servers 140 in cloud computing system 100 in FIG. 1. Data analysis process 800 determines an identification associated with data received in step 810 (step 820). The identification associated with data received in step 810 may be an identifier of a particular computing device such as one of computing devices 110 in FIG. 1. The identification associated with data received in step 810 may also identify a storage processing service such as storage processing 510 in FIG. 5 associated with a computing device from computing devices 110 and a server from servers 140 connected to storages 150 by cloud computing system 100 in FIG. 1.

Data analysis process 800, responsive to determining an identification, applies criteria associated with the identification to the data (step 830). In an illustrative embodiment, the criteria may be a specific person. An image or video file may be identified as being of the specific person by using facial recognition algorithms to determine an identity of the person in the image or video. In addition, the criteria may be based on a clarity of an image. The criteria based on the clarity of the image may eliminate blurry or unfocused image or video files from being saved to backup storage. In an illustrative embodiment, predictive algorithms may be used to determine which image or files a user may most likely want to keep. In an illustrative embodiment, an image or video file may be examined by a processing engine to determine if the composition of the image or video file would be similar to those that were previously liked by the user and prioritization of images or videos would be given to the cloud computing system or data center to images or photographs that are identified as having higher likelihood of being a favorite.

Data analysis process 800, responsive to applying the criteria associated with the identifier to the data, applies one or more rules associated with the identification to the data (step 840).

Data analysis process 800, responsive to applying the one or more rules to the data in step 840, may tag the data in accordance with the one or more rules. In an illustrative embodiment, a rule may direct the data authorized for transmission to storage in the cloud computing system and identify a particular storage device, such as device A 152, device B 154 or device C 156 in storages 150 in FIG. 1.

Data analysis process 800, responsive to tagging the data in accordance with the one or more rules, may direct the data to a storage in a cloud computing system in accordance with the tag (step 860).

A determination is made whether more data is to be processed (step 870) and if so, data analysis process 800 returns to step 820, and if not, stops (step 880).

Figure 9:
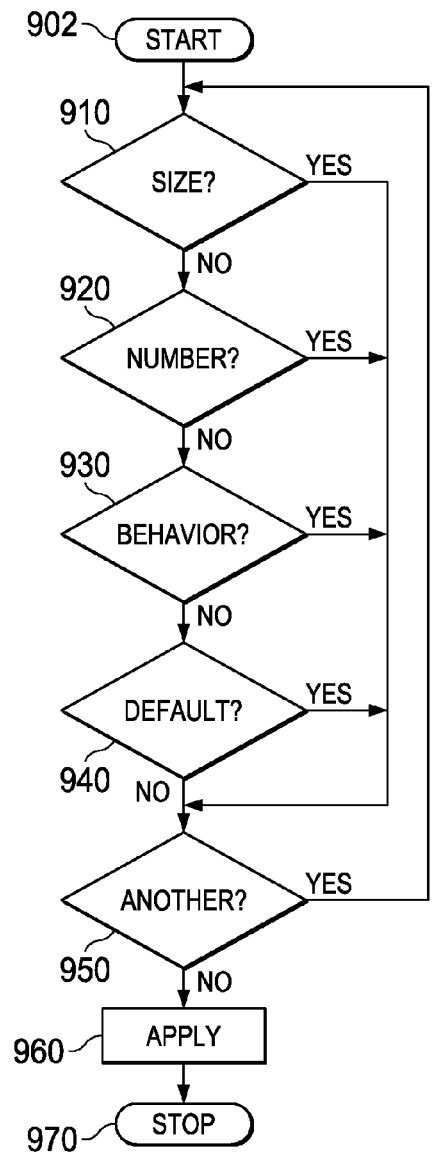
FIG. 9 is a flow chart of a trigger configuration process depicted in accordance with an illustrative embodiment.

Turning to FIG. 9, a flow chart of a trigger configuration process is depicted in accordance with an illustrative embodiment. Trigger configuration process 900 allows a user to automatically engage the analysis and processing of data discussed above in response to a trigger. Trigger configuration process 900 starts (step 902) and determines whether a user has selected a size as a trigger (step 910). In an illustrative embodiment, the size may be a storage capacity that is less than a maximum storage capacity. In another illustrative embodiment, the size may be a file size. Trigger configuration process next determines whether a user has selected a number as a trigger (step 920). In an illustrative embodiment, the number may be a number of data generated by a computing device. The number of data may be a number of image or video files taken during a period of time. In another illustrative embodiment, the number may be a total number of data generated during a period of time. The total number of data may be a total number of image or video files taken files taken. Next, trigger configuration process determines whether the user selects a behavior trigger (step 930). A change in user behavior may be identified. For example, a user may normally take two image or video files a week, but then takes three hundred image or video files in a single day. The foregoing change in user behavior may automatically trigger activation of the prioritization.

A behavior trigger may be a change in a behavior of the user. For example, a computing device of the user may compute an average number of data generated by a user during a period of time. A behavior trigger may be an increase in the average number of data generated during a period of time. A change in behavior may be a predicted change in the average number of data generated in the period of time and calculated by a predictive algorithm in the computing device. In an illustrative embodiment, the increase in the average number of data and the predicted change in the average number of data generated may be based on an increase in the number of image or video files taken and a prediction of an increase in the average number of image or video files taken. Next, trigger configuration process determines whether a user selects a default trigger (step 940). The default trigger may be one or more of a size trigger, a number trigger, and behavior trigger chosen by a manufacturer of the computing device or by a supplier of the enabling software such as application 130 in FIG. 1 and FIGS. 7 and 8. Trigger configuration process 900 determines whether the user will configure another item (step 950), and if so, goes to step 910, and if not, goes to step 960 apply and ends (step 970).

Thus, illustrative embodiments provide a computer implemented method, computer system, and computer program product for identifying, responsive to receiving a data from a computing device connected to the computer in a cloud computing system, identifying a criteria associated with the computing device; determining, responsive to identifying the criteria, whether the data is authorized for transmission to a storage in the cloud computing system; and forwarding, responsive to determining that the data is authorized for transmission to the storage, the data to the storage.

The illustrative embodiments further provide a computer implemented method, computer system, and computer program product for identifying, responsive to identifying the criteria, a rule associated with the criteria; and assigning, responsive to identifying the rule, a priority to the data in accordance with the rule.

The illustrative embodiments further provide a computer implemented method, computer system, and computer program product, wherein the data comprises an image or video file, for analyzing the image or video file to identify the criteria, wherein the criteria is a characteristic of a person in the image or video file, and wherein the characteristic is one of an expression, a color of hair, a color of eyes, and a color of a face.

The illustrative embodiments further provide a computer implemented method, computer system, and computer program product for analyzing the image or video file to determine the criteria, wherein the criteria is a characteristic of an object, wherein the characteristic is one of a clarity, an absence of blurriness, a blurriness, a defect, and a color of the object.

The illustrative embodiments further provide a computer implemented method, computer system, and computer program product for analyzing the image or video file to determine the criteria, wherein the criteria is a characteristic of a landscape, wherein the characteristic is one of a mountain, a seashore, a lake, and a city.

The illustrative embodiments further provide a computer implemented method, computer system, and computer program product for analyzing the image or video file to locate a code, wherein the code is one of a timestamp, a rating, a sharing code, an email address, and a social media designation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An apparatus for selecting data for transmission to a cloud computing system or data center, comprising:
   a bus;
   one or more computer readable storage devices connected to the bus, having computer program instructions stored thereon;
   one or more computer readable memories connected to the bus;
   one or more processors connected to the bus, wherein at least one of the one or more processors executes the computer program instructions using the one or more computer readable memories to direct the apparatus to:

responsive to receiving the data from a computing device connected to a computer in the cloud computing system or data center, determine an identification associated with the data received;

identify, responsive to a determination of the identification, criteria associated with the identification;

determine, responsive to applying the criteria, one or more rules associated with the criteria;

assigning, responsive to applying the one or more rules determined, a priority to the data in accordance with the one or more rules applied, wherein the priority is associated with a selected predefined trigger for activation of prioritization;

tagging the data received, responsive to applying the one or more rules determined, according to the one or more rules associated with the identification;

determine, responsive to tagging the data received, whether the data is authorized for transmission to a storage in the cloud computing system or data center; and forward, responsive to a determination the data tagged is authorized for transmission to the storage in the cloud computing system or data center, the data to the storage in accordance with the activation of prioritization by the selected predefined trigger, wherein the selected predefined trigger for activation of prioritization is a user-selected behavior trigger, and wherein the at least one of the one or more processors executes the computer program instructions using the one or more computer readable memories to further direct the apparatus, responsive to identifying the user-selected behavior trigger of a change in user behavior within a period of time based on an increase in a computed average number of data generated by the computing device within the period of time, to activate the prioritization of the data to be stored within the storage device in the cloud computing system or data center.

2. The apparatus of claim 1, wherein a rule in the one or more rules associated with the criteria directs the data authorized for transmission to storage in the cloud computing system and identifies a particular storage device and wherein the priority is associated with one or more predefined triggers for activation of prioritization.

3. The apparatus of claim 2, wherein the data comprises an image or video file, and wherein the at least one of the one or more processors executes the computer program instructions using the one or more computer readable memories to further direct the apparatus to:

analyze the image or video file to identify the criteria, wherein the criteria is a characteristic of a person in the image or video file, and wherein the characteristic is one of an expression, a color of hair, a color of eyes, and a color of a face.

4. The apparatus of claim 3, wherein the at least one of the one or more processors executes the computer program instructions using the one or more computer readable memories to further direct the apparatus to:

analyze the image or video file to determine the criteria, wherein the criteria is a characteristic of an object, wherein the characteristic is one of a clarity, an absence of blurriness, a blurriness, a defect, and a color of the object.

5. The apparatus of claim 3, wherein the at least one of the one or more processors executes the computer program instructions using the one or more computer readable memories to further direct the apparatus to:

analyze the image or video file to determine the criteria, wherein the criteria is a characteristic of a landscape, wherein the characteristic is one of a mountain, a seashore, a lake, and a city.

6. The apparatus of claim 3, wherein the at least one of the one or more processors executes the computer program instructions using the one or more computer readable memories to further direct the apparatus to:

analyze the image or video file to locate a code, wherein the code is one of a timestamp, a rating, a sharing code, an email address, and a social media designation.

7. The apparatus of claim 1, wherein the selected predefined trigger for activation of prioritization is a user-selected number trigger, and wherein the at least one of the one or more processors executes the computer program instructions using the one or more computer readable memories to further direct the apparatus responsive to identifying the user-selected number trigger of a specified number of data generated by the computing device within a period of time, to activate the prioritization of the data to be stored within the storage device in the cloud computing system or data center.

8. The apparatus of claim 1, wherein the change in user behavior is a predicted change in a computed average number of data generated by the computing device within the period of time.

9. The apparatus of claim 1, wherein the at least one of the one or more processors executes the computer program instructions using the one or more computer readable memories to further direct the apparatus, responsive to calculating a change in a rate at which data is stored in the storage device within a period of time, to activate the prioritization of the data to be stored within the storage device in the cloud computing system or data center.

10. The apparatus of claim 1, wherein the at least one of the one or more processors executes the computer program instructions using the one or more computer readable memories to further direct the apparatus to calculate a projected time when a storage capacity of the storage device will be reached based on a rate of data being transmitted for storage in the storage device.

11. A computer program product for selecting data for transmission to a cloud computing system or data center, comprising:

one or more computer readable storage devices having computer program instructions stored thereon, which when executed by a computer, direct the computer to:

responsive to receiving the data from a computing device connected to a computer in the cloud computing system or data center, determine an identification associated with the data received;

identify, responsive to a determination of the identification, criteria associated with the identification;

determine, responsive to applying the criteria, one or more rules associated with the criteria;

assigning, responsive to applying the one or more rules determined, a priority to the data in accordance with the one or more rules applied, wherein the priority is associated with a selected predefined trigger for activation of prioritization;

tagging the data received, responsive to applying the one or more rules determined, according to the one or more rules associated with the identification;

determine, responsive to tagging the data received, whether the data is authorized for transmission to a storage in the cloud computing system or data center; and forward the data, responsive to a determination the data tagged is authorized for transmission to the storage in the cloud computing system or data center, to the storage in accordance with the activation of prioritization by the selected predefined trigger. wherein the selected predefined trigger for activation of prioritization is a user-selected behavior trigger, and wherein the at least one of the one or more processors executes the computer program instructions to further direct the apparatus, responsive to identifying the user-selected behavior trigger of a change in user behavior within a period of time based on an increase in a computed average number of data generated by the computing device within the period of time, to activate the prioritization of the data to be stored within the storage device in the cloud computing system or data center.

12. The computer program product of claim 11, wherein a rule in the one or more rules associated with the criteria directs the data authorized for transmission to storage in the cloud computing system and identifies a particular storage device and wherein the priority is associated with one or more predefined triggers for activation of prioritization.

13. The computer program product of claim 12, wherein the data comprises a image or video file, and the one or more computer readable storage devices have computer program instructions stored thereon, which when executed by a computer, direct the computer to:
analyze the image or video file to identify the criteria, wherein the criteria is a characteristic of a person in the image or video file, and wherein the characteristic is one of an expression, a color of hair, a color of eyes, and a color of a face.

14. The computer program product of claim 12, wherein the one or more computer readable storage devices have computer program instructions stored thereon, which when executed by a computer, direct the computer to:
analyze the image or video file to determine the criteria, wherein the criteria is a characteristic of an object, wherein the characteristic is one of a clarity, an absence of blurriness, a blurriness, a defect, and a color of the object.

15. The computer program product of claim 12, wherein the one or more computer readable storage devices have computer program instructions stored thereon, which when executed by a computer, direct the computer to:
analyze the image or video file to determine the criteria, wherein the criteria is a characteristic of a landscape, wherein the characteristic is one of a mountain, a seashore, a lake, and a city.

16. The computer program product of claim 11, wherein the one or more computer readable storage devices have computer program instructions stored thereon, which when executed by a computer, direct the computer to:
analyze the image or video file to locate a code, wherein the code is one of a timestamp, a rating, a sharing code, an email address, and a social media designation.

17. The computer program product of claim 11, wherein the selected predefined trigger for activation of prioritization is a user-selected number trigger, and wherein the one or more computer readable storage devices have computer program instructions stored thereon, which when executed by a computer, direct the computer responsive to identifying the user-selected number trigger of a specified number of data generated by the computing device within a period of time, to activate the prioritization of the data to be stored within the storage device in the cloud computing system or data center.

* * * * *